United States Patent Office 3,543,085
Patented Nov. 24, 1970

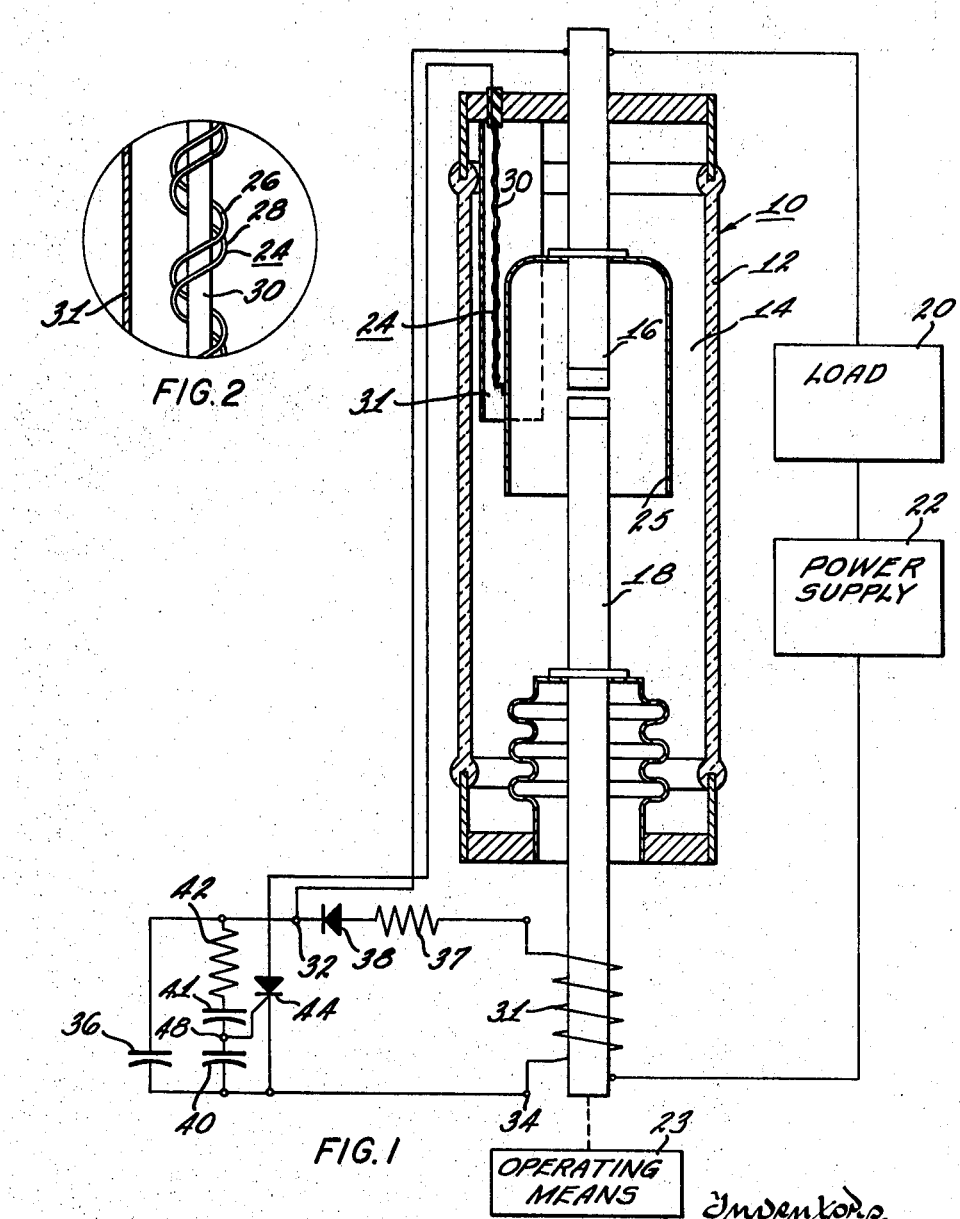

3,543,085
FLASHER TYPE GETTER FOR VACUUM DEVICE
Herbert M. Pflanz, Roslindale, and Charles P. Goeller, Quincy, Mass., assignors to Allis-Chalmers Manufacturing Company, Milwaukee, Wis.
Filed Dec. 23, 1968, Ser. No. 786,087
Int. Cl. H01j 17/22
U.S. Cl. 315—108                                5 Claims

ABSTRACT OF THE DISCLOSURE

A vacuum switch comprising an evacuated chamber and separable contacts therein which are in circuit with a source of electric power is provided with titanium molybdenum getter disposed on a tungsten filament inside the chamber. Control means are provided whereby the filament is periodically energized to heat it and to thereby flash the getter to a predetermined temperature for a predetermined length of time at predetermined intervals. The control means comprise a current transformer which is inductively coupled to the vacuum switch power source. A controlled rectifier (normally off) is in series circuit with the tungsten filament across the transformer output. A first capacitor chargeable from the transformer discharges periodically at predetermined intervals to turn on the rectifier. A second capacitor chargeable from the transformer discharges a predetermined amount of energy for a predetermined amount of time when the rectifier is turned on to heat the filament and flash the getter.

SUMMARY OF THE INVENTION

This invention relates generally to means for gettering gas in vacuum type devices. More particularly, it relates to getters which are heated or flashed to predetermined temperatures for predetermined lengths of time at predetermined intervals.

In some vacuum type devices, such as vacuum type electric circuit interrupters and switches, which have an evacuated chamber, undesirable absorbed gases are liberated inside the chamber which need to be removed to insure proper operation of the device. These gases can be removed by pumping the chamber or by heating a getter inside the chamber. Heretofore, the getter was heated by means of an externally located induction heater or the getter was heated continuously by means of an electric filament. However, to employ pumping or induction heated filaments usually required removing the device from service and gettering was confined to such periods. On the other hand, the continuously heated filaments had a relatively short life and needed to be replaced periodically. It is desirable, therefore, to overcome these and other disadvantages.

In accordance with the present invention, there is provided a vacuum type device, such as a vacuum circuit interrupter or vacuum switch, comprising an evacuated chamber. A getter is exposed to a gas or gases which are liberated within the chamber. Means are provided to heat the getter to a predetermined temperature for a predetermined length of time at predetermined intervals. Such means comprise first means for supplying the predetermined amount of energy for a predetermined length of time and take the form of a source of electric power and first capacitor means chargeable therefrom. Such means further comprise second means to effect supplying of energy from the first means to the getter at predetermined intervals and take the form of second capacitor means for triggering a controlled rectifier to allow the first capacitor means to discharge and supply power to resistance means which heat the getter.

OBJECTS

It is an object of the present invention to provide improved means for gettering gas or gases in vacuum type devices.

Another object is to provide gettering means of the aforesaid character wherein the getter is heated to predetermined temperatures for predetermined lengths of time at predetermined intervals.

Another object is to provide means of the aforesaid character which comprise first means to heat the getter to a predetermined temperature for a predetermined length of time and further comprise second means to effect such heating at predetermined intervals.

Another object is to provide means of the aforesaid character wherein said first means and said second means each comprise capacitor means and wherein said second means further comprise a controlled rectifier.

Another object is to provide means of the aforesaid character which are relatively simple and economical to fabricate, which are compact and reliable, which are adjustable and which prolong the life of the getter heater.

Other objects and advantages of the invention will hereinafter appear.

DRAWINGS

The accompanying drawing illustrates a preferred embodiment of the invention, but it is to be understood that the embodiment illustrated is susceptible of modifications with respect to details thereof without departing from the scope of the appended claims.

In the drawing, FIG. 1 is a cross sectional view of a vacuum type device, such as a vacuum type electric circuit interrupter, employing a getter and heating means therefore in accordance with the invention, and FIG. 2 is an enlarged view of a portion of the getter shown in FIG. 1.

DESCRIPTION OF THE INVENTION

Referring to FIG. 1 of the drawing, the numeral 10 designates a vacuum type device, such as a vacuum type electric circuit interrupter or vacuum switch, with which the present invention is advantageously employed. Vacuum switch 10 comprises an envelope 12 defining an evacuated chamber 14 in which a relatively high vacuum is maintained to insure proper operation of the device. Vacuum switch 10 has a pair of relatively movable contacts 16 and 18 located in chamber 14 and connected in series circuit with a load 20 across a source of electric power 22, such as an alternating current source. Contact 18 is understood to be reciprocably movable by operating means 23 to open and closed positions thereby controlling energization of load 20 from power supply 22. Contacts 16 and 18 are surrounded by a metal shield 25 which controls dispersion of arcing by-products within chamber 14.

It is to be understood that some components in switch 10 contain absorbed gases which are undesirable. Arcing which occurs upon separation of contacts 16 and 18 effects heating of the surfaces of the various components within chamber 14 and some of the absorbed gases are released to contaminate the vacuum environment and provide a risk of failure of operation of switch 10.

A getter 24 is provided in switch 10 and is exposed to such gas or gases which evolve in evacuated chamber 14. Getter 24 comprises one or more materials which by nature tend, when heated, to absorb gas or gases which are likely to be liberated in chamber 14 and need to be gettered. Getter 24 must be heated to some predetermined temperature (determined by the choice of gettering material) in order to getter selected gases effectively. In the embodiment shown in FIGS. 1 and 2, for example, getter 24 preferably takes the form of a pair of wires 26 and 28, one made of titanium and the other of molybdenum, which is located within chamber 14 and physically supported on a member 30, such as a tungsten filament, which serves as part of the means for heating getter 24 to cause it to perform its gettering function. Preferably, getter 24 and filament 30 are enclosed by a suitable metal shield 31. It is to be understood, for example, that filament 30 and getter 24 thereon are adapted to be heated to temperatures on the order of 1200° centigrade. At such temperatures, the getter materials sublime and condense on colder portions of vacuum switch 12, such as the surface of metal shield 25.

In addition to filament 30, the means to effect heating of filament 30 and getter 24 to its predetermined temperature for a predetermined time at predetermined intervals further comprise a first means for supplying a predetermined amount of energy for a predetermined length of time to filament 30 and second means for effecting or controlling the supply of energy to the first means.

The aforesaid first means comprise a source of electrical power such as a current transformer 31 having a winding which is inductively coupled to movable contact 18 and is thus adapted to receive power from power supply 22. Current transformer 31 is designed so as to be highly saturated thereby insuring that its output voltage remains relatively constant despite such variations of primary current as may exist through contact member 18 during normal operation of device 10. Current transformer 31 is provided with a filtering means comprising a resistor 37 and a rectifier 38 and with output terminals 32 and 34. A first capacitor means 36 is connected across terminals 32 and 34 and is charged from transformer 31. First capacitor means 36 is adapted to discharge a predetermined amount of energy for a predetermined length of time to effect heating of filament 30.

The aforesaid second means comprise a second capacitor means comprising capacitors 40 and 41 which are connected in series with each other and with a resistor means 42 across the output terminals 32 and 34. A controlled rectifier 44, normally off, is connected in series with filament 30 across the output terminals 32 and 34. The gate of controlled rectifier 44 is connected to a point 48 between the capacitors 40 and 41.

Capacitors 40 and 41 are charged from transformer 31 and are adapted to discharge at predetermined intervals to turn on controlled rectifier 44 thereby allowing capacitor means 36 to discharge its energy through filament 30 at predetermined intervals. After discharge of capacitors 40 and 41, controlled rectifier 44 again becomes nonconductive and the charging cycle will begin again. When capacitor means 36 discharges, a predetermined amount of energy is made available to getter 24 for a predetermined length of time. The intervals between the times at which getter 24 is periodically flashed are of such a length of time that capacitor means 36 can be fully recharged. The length of time the getter is flashed is also such that capacitor means 36 can deliver its full amount of stored energy for a length of time sufficient to accomplish proper heating of filament 30. Longer and shorter intervals and flashing periods are determined by the choice of circuit elements and components.

In a situation where device 10 is permanently installed, it might be reasonable, for example, to flash getter 24 for several milliseconds at intervals ranging from 20 minutes to 24 hours. In cases where device 10 is regularly or periodically removed for servicing and maintenance, it might be desirable to flash getter 24 at much shorter intervals of, for example, one minute. In general, the intervals should be long enough to permit the gettering material to sublime and condense on adjacent surfaces without causing undue heating of the surfaces of components adjacent filament 30 and long enough to allow capacitor means 36 to recharge fully.

If filament 30 were heated continuously, its life would be very short while the vacuum level in chamber 14 would not be substantially improved. However, the aforedescribed invention effects intermittent firing or flashing of getter 24 and the life of filament 30 is considerably prolonged. Thus, servicing of device 10 is reduced. Furthermore, the means for heating getter 24 are compact and are readily mountable in the same location as device 10 as part of a permanent installation.

The embodiments of the invention in which an exclusive property or privilege is claimed are defined as follows:

1. In combination,
   a vacuum type device having an evacuated chamber,
   a getter exposed to a gas present within said chamber,
   and means for heating said getter to a predetermined temperature for a predetermined length of time at predetermined intervals,
   said means comprising a source of electrical power,
   first means comprising first capacitor means which are chargeable from said source of power and are dischargeable to supply a predetermined amount of energy for said predetermined length of time to said getter,
   and second means comprising second capacitor means which are chargeable from said source of power and are dischargeable at predetermined intervals to effect supplying of said energy from said first capacitor means at said predetermined intervals.

2. A combination according to claim 1 comprising a controlled rectifier which is operated by discharge of said second capacitor means to effect discharge of the energy of said first capacitor means to effect heating of said getter.

3. A combination according to claim 2 wherein said means for heating said getter comprise resistance means in circuit with said controlled rectifier.

4. A combination according to claim 3 wherein said source of electrical power comprises a transformer, wherein said first and second capacitor means are connected to said transformer,
   wherein said resistance means and said controlled rectifier are connected to said transformer,
   and wherein said second capacitor means is connected to control said rectifier.

5. A combination according to claim 4 wherein said resistance means is located in said chamber and said getter is disposed on said resistance means.

References Cited

UNITED STATES PATENTS

| 1,712,370 | 5/1929 | White | 313—180 |
| 3,371,853 | 3/1968 | Maliakal | 230—69 |

RAYMOND F. HOSSFELD, Primary Examiner

U.S. Cl. X.R.

313—180